United States Patent
Yamaura

[11] Patent Number: 5,989,744
[45] Date of Patent: Nov. 23, 1999

[54] NON-AQUEOUS ELECTROLYTE SECONDARY CELL

[75] Inventor: Kiyoshi Yamaura, Kanagawa, Japan

[73] Assignee: Sony Corporation, Tokyo, Japan

[21] Appl. No.: 08/902,218

[22] Filed: Jul. 29, 1997

[30] Foreign Application Priority Data

Jul. 31, 1996 [JP] Japan ................................. 8-202183

[51] Int. Cl.$^6$ ................................................ H01M 4/52
[52] U.S. Cl. ........................................ 429/223; 429/231.3
[58] Field of Search .............................. 429/223, 231.1, 429/231.3

[56] References Cited

U.S. PATENT DOCUMENTS 5,620,812  4/1997  Tahara et al. ............................ 429/223
5,631,105  5/1997  Hasegawa et al. ...................... 429/194

FOREIGN PATENT DOCUMENTS 6-275275  9/1994  Japan .
WO 98/06670  2/1998  Japan .

*Primary Examiner*—Maria Nuzzolillo
*Assistant Examiner*—Carol Chaney
*Attorney, Agent, or Firm*—Hill & Simpson

[57] ABSTRACT

The present invention provides a non-aqueous electrolyte secondary cell in which charge/discharge property and energy density are significantly improved. The non-aqueous electrolyte secondary cell according to the present invention is provided with a positive electrode whose active material is $Li(Ni_{1-y}Co_y)_{1-z}B_zO_2$ (wherein y and z represent Ni, Co and B composition ratio which satisfies the relationships $0.1y \leq z < 0.05y + 0.026$, $y > 0$, and $0 < z \leq 0.03$); a negative electrode capable of doping and de-doping lithium; and a non-aqueous electrolytic solution made from lithium salt dissolved or dispersed in a non-aqueous medium.

8 Claims, 1 Drawing Sheet

NON-AQUEOUS ELECTROLYTE SECONDARY CELL

BACKGROUND OF THE INVENTION

1. Field of the Invention

The present invention relates to a non-aqueous electrolyte secondary cell, and more particularly to an improvement of a material to be used for a positive electrode thereof.

2. Prior Art

In association with a recent remarkable progress of electronic techniques, various portable electronic devices have been developed such as a camera-attached Video Tape Recorder, a pocket telephone, and a lap top computer. There is therefore an increasing demand for portable power sources for such electronic devices, i.e. a strong demand for development of a small-size secondary cell or battery having a higher energy density than the conventional ones. The widely known conventional secondary cells are: nickel-cadmium cells, lead accumulators, and lithium secondary cells.

The lithium secondary cells are expected as cells capable of composing a battery having a high power with a high energy density. Some of the lithium secondary cells are already available in a market. Because lithium has strong reactivity against water, such lithium secondary cells employs lithium salt such as $LiPF_6$ dissolved in a non-aqueous solvent such as propylene carbonate and diethyl carbonate.

The lithium secondary cell may employ a metallic lithium or a lithium alloy as a negative electrode active material. Recently, however, there is a tendency to employ a material which will not produce a dendrite even charge and discharge are repeated, for example, such as a carbonaceous material which is capable of doping and de-doping lithium ions.

As for a positive electrode active material, a metallic sulfide, and a metallic oxide such as $TiS_2$, $MoS_2$, $NbSe_2$, and $V_2O_5$ having no lithium have been used. Recently, however, more and more lithium-nickel composite oxides are used because of a higher energy density and a lower production cost.

It should be noted that a lithium secondary cell using such a lithium-nickel composite oxide for the positive electrode active material has a problem that a charge capacity during an initial charge is greater than a discharge capacity by 40 to 50 mAh/g. Consequently, the ratio between the lithium which has been separated during charge and the lithium which has been returned, i.e., charge/discharge property (initial charge capacity/initial discharge capacity) is lower by 5 to 6% than that of a lithium-cobalt composite oxide which is used in practice. The low charge/discharge property affects the energy density and has been a serious obstacle for realizing a large capacity.

OBJECT AND SUMMARY OF THE INVENTION

The present invention has been accomplished in view of the afore-mentioned problems in the prior art. It is therefore an object of the present invention to provide a non-aqueous secondary cell having an improved charge/discharge property and an improved energy density.

The charge/discharge property can be improved by dissolving cobalt in a lithium-nickel composite oxide. However, the inventor of the present invention discovered, after repeating experiments, that the charge/discharge property can be improved significantly by containing boron at a particular ratio. This discovery completed the present invention.

The non-aqueous electrolyte secondary cell according to the present invention is characterized by including:

a positive electrode using an active material which is $Li(Ni_{1-y}Co_y)_{1-z}B_zO_2$ (wherein y and z indicate a composition ratio of Ni, Co, and B: $0.1y \leq z \leq 0.05y+0.026$; y>0; and $0<Z\leq 0.03$);

a negative electrode using a negative electrode active material which is able to dope and de-dope lithium; and a non-aqueous electrolyte having a lithium salt dissolved or dispersed in a non-aqueous solvent.

According to the non-aqueous electrolyte secondary cell according to the present invention, cobalt and boron whose ratio satisfies the above relationship are dissolved in the lithium-nickel composite oxide used as the positive electrode active material, which enables to improve a charge/discharge property and energy density of the cell.

If the composition ratio of the cobalt and boron in the $Li(Ni_{1-y}Co_y)_{1-z}B_zO_2$ is out of the range: $0.1y \leq z \leq 0.05y+0.026$ wherein y>0, then the charge/discharge property becomes lower than even a case when no boron is added. Moreover, when the boron content increases up to $0.03<z$, an absolute value of the positive electrode charge capacity is decreased and the energy density is lowered than that of $LiCoO_2$ which is used in practice. Therefore, the composition ratio of cobalt and boron is preferably in the range: $0.1y \leq z \leq 0.05y+0.026$ wherein y>0 and $0<z\leq 0.03$.

DETAILED DESCRIPTION OF THE INVENTION

Figure 1:
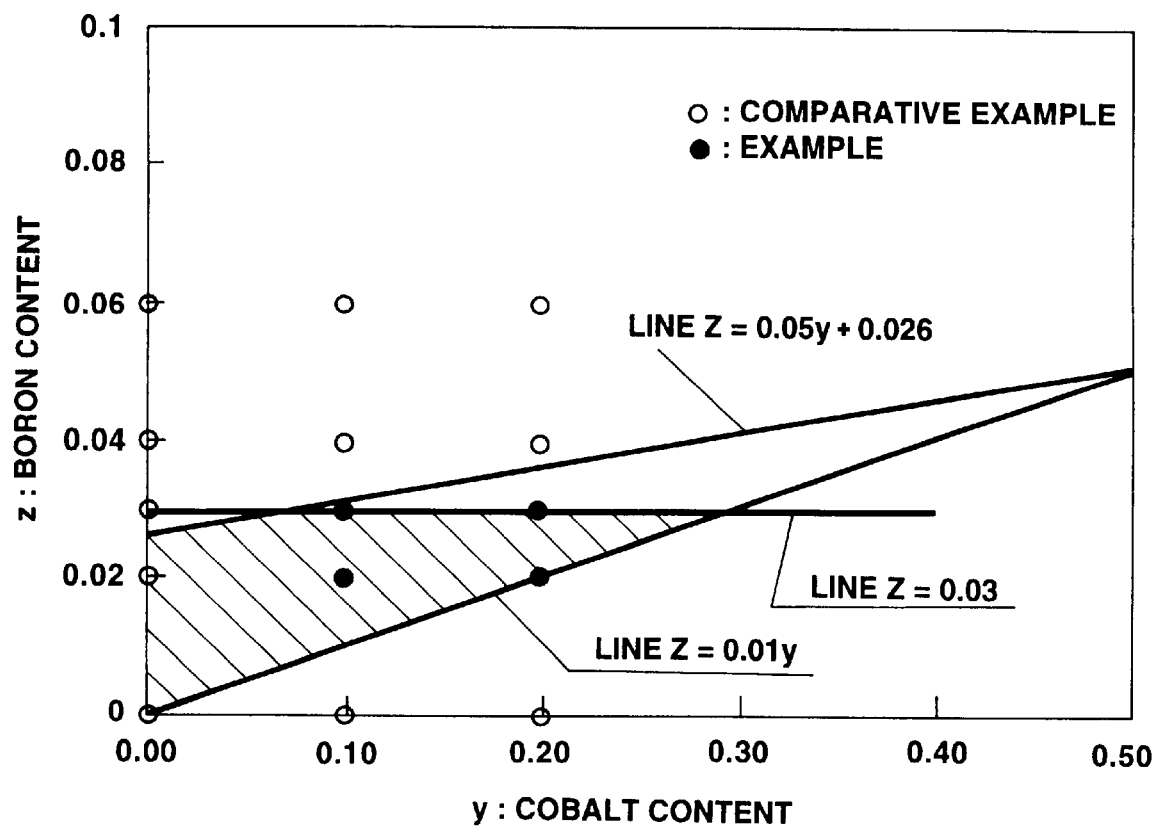
FIG. 1 that shows a positive electrode active material of a non-aqueous electrolyte secondary cell according to the present invention has a range of the energy density above that of the conventional $LiCoO_2$.

Hereinafter, a non-aqueous electrolyte secondary cell according to the present invention will be described in detail.

The non-aqueous electro lyte secondary cell according to the present invention is characterized in that a positive electrode thereof uses a lithium-nickel composite oxide containing cobalt and boron in a predetermined range of a composition ratio. The non-aqueous electrolyte secondary cell using a positive electrode active material made of a lithium-cobalt-nickel composite oxide containing boron atoms shows an improved initial charge property.

The reason thereof is not clear. However, it is possible to understand as follows. In general, a lithium composite oxide containing a plenty of nickel shows an initial charge curve which is different from a subsequent charge/discharge curve. The difference can be represented as a capacity difference of 30 to 60 mAh/g in a range of 4.2 to 3.0 V. (A. Rougier, C. Delmas et al. J. Electrochem. Soc., Vol. 143, No. 4, p. 1168(1996)). However, when boron is fused and bonded into a part of a crystal lattice, a charge capacity alone decreases, leaving discharge capacity almost as it is. As a result, a capacity difference between charge and discharge is reduced.

In order to improve the charge property, a boron content in a lithium-nickel-cobalt oxide represented as $Li(Ni_{1-y}Co_y)_{1-z}B_zO_2$ (wherein y and z indicate a composition ratio of Ni, Co, B) should be in a range which satisfies the following: $0.1y \leq z \leq 0.05y+0.026$ and y>0. If the boron content is out of this range, the charge/discharge property is lowered even compared to a case when no boron is added.

On the other hand, as the boron content ratio increases, an absolute value of the discharge capacity of the positive electrode is decreased. For example, if the boron content ratio is $0.03 \leq a$, an absolute value of the charge/discharge capacity of the positive electrode is decreased and the energy density becomes lower than that of $LiCo_2$ which is used in practice. Consequently, in order to obtain an energy density higher than $LiCoO_2$, the boron composition ratio should satisfies $0 < z \leq 0.03$.

That is, if the lithium-cobalt-nickel composite oxide used as an positive electrode active material is represented as $Li(Ni_{1-y}Co_y)_{1-z}B_zO_2$ (wherein y and z indicate the composition ratio of Ni, Co, and B), y and z should satisfy the following relationship: $0.1y \leq z \leq 0.05y+0.026$, $y>0$, and $0 < z \leq 0.03$. In this composition range, it is possible to improve the charge/discharge property and to obtain a higher energy density.

It should be noted that the lithium-cobalt-nickel composite oxide can be represented more strictly as $Li(Ni_{1-y}Co_y)_{1-z}B_zO_{2-p}$. An oxygen content in the lithium-cobalt-nickel composite oxide need not be strictly p=0. That is, an oxygen lack or excess can be allowed.

Moreover, the lithium composite oxide of the positive electrode active material involved in a cell can be represented as $Li_x(Ni_{1-y}Co_y)_{1-z}B_zO_{2-p}$. A value of the lithium content x in the lithium composite oxide is a value which varies during charge and discharge.

The above-mentioned positive electrode active material can be prepared by using a lithium compound, a nickel compound, a cobalt compound, and a boron compound as raw materials such as carbonate, nitrate, sulfate, oxide, hydroxide, and halide of lithium, nickel, and cobalt; and boron oxide. Then, these lithium salt material, nickel salt material, cobalt salt material and boron oxide material are weighed according to a preferable composition and mixed sufficiently. After this, the mixture is heated and calcinated in an oxygen atmosphere under a temperature ranging from 600 to 1000° C. so as to obtain a preferable positive electrode active material. In this case, the mixing of the components is not restricted to a particular method. The salts in powder states can be mixed as they are in a dry state or the salts in powder states can be dissolved in water and then obtained aqueous solutions can be mixed.

When preparing a positive electrode from such a positive electrode active material, it is possible to uniformly mix the powder of the positive electrode active material, if necessary, together with an electroconductive material such as carbon black and graphite, and further, with a binder resin such as polyvinylidene fluoride (PVDF) so as to obtain a positive electrode compound reagent, which is compressed to be molded into a pellet shape of a positive electrode for a coin-type secondary cell.

Alternatively, it is also possible to further add a solvent such as formamide and N-methylpyrolidone to the powder of the positive electrode active material, the electroconductive material, and the binder resin, so as to obtain a positive electrode composite reagent in a paste state which is applied onto a collector of the positive electrode and dried to obtain a positive electrode for a cylindrical or angular secondary cell. Binder resins which are known to public can be used as the binder resin.

The positive electrode which has been prepared from the above-mentioned positive electrode active material is suitable for constituting a non-aqueous electrolyte secondary cell having a negative electrode made of a material capable of doping and de-doping lithium, such as a carbonaceous material and a lithium alloy; and a non-aqueous electrolyte made of a lithium salt solution.

The material capable of doping and de-doping lithium for use as a negative electrode of the non-aqueous electrolyte secondary cell may be, for example, carbonaceous material such as pyrolytic carbons, cokes (pitch coke, needle coke, and petroleum coke), graphite, glassy carbons, calcinated organic compounds (phenol aldehyde resin, furan resin, or the like which has been calcinated at an appropriate temperature), carbon fibers, and activated carbon; or polymers such as polyacetylene and polypyrol. The lithium alloy may be, for example, a lithium-aluminum alloy.

As for the negative electrode active material, as has been mentioned above, each of those materials used for a secondary cell can be used for a negative electrode. However, those carbonaceous materials which will be described below are particularly preferable.

First of all, one of the most preferable materials is a carbonaceous material which will not be graphitized even if treated by heat in the order of 3000° C., i.e., a non-graphitizable carbon.

As a starting raw material for preparing such a non-graphitizable carbonaceous material, it is preferable to use a furan resin made of a homopolymer or a copolymer of furfuryl alcohol or furfural, because such a furan resin which has been carbonized becomes a material exhibiting excellent properties as a negative electrode material of a cell: a spacing of (0 0 2) is 0.37 nm or above; a true density is 1.70 g/cc or below; and a differential thermal analysis (DTA) shows an oxidation exothermic peak at 700° C. or above.

It is also possible to use as another starting material, an organic material made of a petroleum pitch having a particular H/C atomic ratio and containing a functional group containing oxygen (so called oxygen crosslink), which organic material, when carbonized, becomes a carbonaceous material with excellent properties in the same way as the above-mentioned furan resin.

The above-mentioned petroleum pitch can be obtained through operations such as distillation (vacuum distillation, atmospheric distillation, steam distillation), thermal polymerization/condensation, extraction, chemical polymerization/condensation or the like of tars and asphalts obtained through high-temperature thermal cracking of coal tar, ethylene bottom oil, crude oil or the like.

In this case, what is important about the petroleum pitch is the H/C atomic ratio. The H/C atomic ratio should be 0.6 to 0.8 in order to obtain a non-graphitizable carbon.

The method how to introduce the functional group containing oxygen into the petroleum pitch is not restricted to particular means. For example, it is possible to use a wet type method using an aqueous solution of nitric acid, mixed acid, sulfuric acid, hypochlorous acid or the like; a dry type method using an oxidation gas (air, oxygen, or the like); a solid type method using a reaction of a solid reagent sulfuric acid, ammonium nitrate, ammonium persulfate, ferric chloride, or the like.

For example, when a functional group containing oxygen is introduced to the petroleum pitch in the above-described method, it is possible to obtain a final carbonaceous material in a solid state without melting during a process of carbonization (at about 400° C.), which is similar to the process for preparing a non-graphitizable carbon.

The petroleum pitch into which a functional group containing oxygen has been introduced is further carbonized so as to obtain a negative electrode material. In this case, carbonization conditions are not restricted to a particular one. If the carbonization condition is defined so as to enable to obtain a carbonaceous material which satisfies the following characteristics: (0 0 2) spacing of 0.37 nm or above, true density of 1.70 g/cc or below, and differential thermal analysis (DTA) not exhibiting an oxidation exothermic peak above 700° C.; then it is possible to obtain a negative electrode material having a large lithium doping amount per unit weight. For example, if the condition is defined so as to realize that a precursor prepared from an oxygen-crosslinked petroleum pitch has an oxygen content of 10% by weight or above, it is possible to obtain 0.37 nm or above of (0 0 2) spacing of a carbonaceous material to be prepared. Consequently, it is preferable that the oxygen content of the aforementioned precursor be 10% by weight or above, and in practice, in a range of 10 to 20% by weight.

The organic material to be oxygen-crosslinked should have the H/C atomic ratio of 0.6 to 0.8, which can be obtained by preliminary thermal processing (such as pitching) of starting raw materials as follows.

Such starting raw materials may be: organic high molecular compounds such as phenolic resin, acrylic resin, halogenated vinyl resin, polyimide resin, poly-amide-imide resin, polyamide resin, conjugate resin, cellulose, and derivatives thereof; condensated polycyclic hydrocarbon compounds such as naphthalene, phenanthralene, anthracene, triphenylene, pyrene, perylene, pentaphene, pentacene, and derivatives thereof (for example, carboxylic acid, carboxylic anhydride, carboxylic imide thereof, or the like); various types of pitches each having as a main component a mixture of the above-mentioned compounds; and condensated heterocyclic compounds such as acenaphthylene, indole, isoindole, quinoline, isoquinoline, quinoxaline, phthalazine, carbazole, acridine, phenazine, phenanthracene, or the like, and derivatives thereof.

The negative electrode active material may be a carbonaceous material which is graphitized when treated at about 3000° C., i.e., a graphitizable carbon.

The starting raw material of the graphitizable carbon may be organic material such as coat and pitch.

The pitch can be obtained from tars and asphalt obtained through high-temperature cracking of coal tar, ethylene bottom oil, crude oil or the like which are then subjected to operations such as distillation (vacuum distillation, atmospheric distillation, steam distillation), thermal polymerization/condensation, extraction, chemical polymerization/condensation or the like. There is also a pitch which can be obtained during wood dry distillation.

Raw materials of the high molecular compounds may be polyvinyl chloride resin, polyvinyl acetate, polyvinyl butyrate, 3, 5-dimethylphenol resin, or the like.

These starting raw materials are in a liquid state at about 400° C. at maximum during carbonization. If these materials are kept at this temperature, aromatic rings are condensed with one another so as to become polycyclic and layered. After this, when the temperature becomes about 500° C. or above, a solid carbon precursor, i.e., semicoke is obtained. This process is called a liquid-phase carbonization process, which is a typical process for the graphitizable carbon.

The above-mentioned raw materials of coal, pitch, and high molecular compounds go through this liquid-phase carbonization process when they are carbonized.

Besides these materials, it is possible to use as the starting raw materials: condensed polycyclic hydro carbonate compounds such as naphthalene, phenanthracene, anthracene, triphenylene, pyrene, perylene, pentaphene, pentacene, and derivatives thereof (for example, carboxylic acid, carboxylic anhydride, carboxylic imide thereof, or the like); mixtures of the aforementioned compounds; and condensed heterocyclic compounds such as acenaphthylene, indole, isoindole, quinoline, isoquinoline, quinoxaline, phthalazine, carbazole, acridine, phenazine, phenanathracene, or the like, and derivatives thereof.

When the above-mentioned organic raw materials are used to obtain a carbonaceous material, it is recommended to carry out carbonization at 300 to 700° C. in a nitrogen stream and then calcinating in a nitrogen stream under a temperature condition as such that the temperature increases 1 to 20° C. per minute until the temperature reaches 900 to 1300° C. and then the reached temperature is kept for 0 to 5 hours. In some cases, it is possible to omit the process of carbonization.

Furthermore, the negative electrode active material may be a graphitized carbonaceous material having (0 0 2) spacing of 0.337 nm or below; crystal thickness along the G axis of 16.0 nm or above; G value of 2.5 or above in the Raman spectrum; and true density of 2.1 g/cm$^3$ or above. This material exhibits an excellent electrode charge property, enabling to obtain a large capacity cell.

The representative material showing the above-mentioned material characteristic parameters is natural graphite. Artificial graphite obtained from an organic material which has been carbonized and thermally treated also shows the aforementioned material characteristic parameters. In order to obtain an artificial graphite, it is possible to use the aforementioned graphitizable carbonaceous material as a precursor, which is treated at a high temperature of 2000° C. or above.

The carbonaceous materials thus far described are crushed and classified into various classes so as to be used as a negative electrode material. The crushing process may be carried out prior to or after the carbonation, calcination, high-temperature thermal treatment, or during the stage of temperature increase.

When a carbonaceous material is used to form a negative electrode from these materials, in the same ways as when preparing a positive electrode, the carbonaceous material in powder is uniformly mixed with a binder resin such as polyvinylidene fluoride (PVDF) so as to prepare a composite reagent for a negative electrode, which is then subjected to compression molding so as to form a negative electrode of a pellet shape for a coin-type secondary cell.

In addition to the carbonaceous material in powder and the binder resin, it is also possible to add a solvent such as formaldehyde and N-methylpyrolidone so as to prepare a positive electrode composite reagent in a paste state, which is then applied onto a negative electrode collector and dried, so as to obtain a positive electrode for a cylindrical or angular secondary cell. As for the binder resin, known binders can be used.

When using a metallic lithium or a lithium alloy as a negative electrode material, it is possible to mechanically punch out a predetermined shape (for example, a pellet shape) from a plate-type metallic lithium or lithium alloy so as to obtain a negative electrode.

As for the non-aqueous electrolytic solution for constituting a non-aqueous electrolyte secondary cell, it is possible to use a non-aqueous electrolytic solution prepared from a lithium salt electrolyte dissolved or dispersed in a conventional non-aqueous medium (a non-aqueous solvent or an ion electroconductive polymer) or a solid electrolyte. For example, the non-aqueous solvent of the non-aqueous electrolytic solution may be propylene carbonate, ethylene carbonate, butylene carbonate, vinylene carbonate, γ-butyrolactone, and sulfolane, 1, 2-diethoxyethane, 2-methyltetrahydrofuran, 3-methyl-1, 3-dioxisoran, methyl propionate, methyl butyrate, dimethyl carbonate, diethyl carbonate, dipropylen carbonate, or the like. Judging from voltage stability, it is preferable to use chain carbonates such as propylene carbonate and vinylene carbonate. Moreover, the non-aqueous solvent may be made from a single carbonate or a mixture of more than one carbonates.

As for the electrolyte to be dissolved in a non-aqueous solvent may be, for example, $LiClO_4$, $LiPF_6$, $LiAsF_6$, $LiBF_4$, $LiCF_3SO_3$, and $LiN(CF_3SO_2)_2$. Among these, $LiPF_6$ and $LiBF_4$ are most preferable.

The constitution of the other components of the non-aqueous electrolyte secondary cell such as a separator and a cell casing may be prepared in the same way as the conventional non-aqueous electrolyte secondary cell, and is not limited to a particular type. The shape of the cell may be cylindrical, angular, coin-type, button-type, or the like, and is not limited to a particular shape.

EXAMPLES AND COMPARATIVE EXAMPLES

Description will now be directed to examples of a lithium secondary cell using $Li(Ni_{1-y}Co_y)_{1-z}B_zO_2$ as the positive electrode active material.

Example 1

Lithium nitrate (having purity of 99.0% or above), nickel oxide (having purity of 99% or above), and cobalt oxide (having purity of 99% or above) were mixed so as to satisfy the relationship: Li:Ni:Co=10:9:1(y=0.1), and calcinated in an oxygen reflux for about 6 hours. Thus, a black powder of $LiNi_{0.9}Co_{0.1}O_2$ was obtained. It should be noted that the oxygen content represented here by "2" does not necessarily mean strictly "2.000".

Lithium metaborate ($LiBO_2$) was added to the obtained lithium nickel oxide, which was then calcinated at 750° C. so as to obtain a lithium composite oxide of black color in which z=0.02, i.e., $Li(Ni_{0.9}Co_{0.1})_{0.98}B_{0.02}O_2$, was obtained.

Subsequently, for 90 weight parts of this lithium composite oxide, 7 weight parts of graphite and 3 weight parts of fluorocarbon high-molecular binder were added, and mixed by using dimethylformamide, which mixture was then sufficiently dried, perfectly volatilizing the dimethylformamide as a solvent. Then, 60 mg of this mixture was measured and subjected to compression molding so as to obtain a disc shape having a surface area of about 2 cm$^2$, serving as a positive electrode.

Next, a coin-type lithium ion secondary cell was prepared by using thus-obtained positive electrode, a negative electrode of a lithium metal which has been punched out into a disc shape, and electrolytic solution. Here, the amount of the lithium is hundreds times more than the maximum charge capacity of the positive electrode and will no limit the electrochemical properties of the positive electrode. The electrolytic solution used was $LiPF_6$ dissolved in propylene carbonate.

Example 2

A coin-type lithium secondary cell was prepared in the same way as Example 1 except for that the lithium composite oxide had the composition defined as y=0.2 and z=0.02.

Example 3

A coin-type lithium secondary cell was prepared in the same way as Example 1 except for that the lithium composite oxide had the composition defined as y=0.1 and z=0.03.

Example 4

A coin-type lithium secondary cell was prepared in the same way as Example 1 except for that the lithium composite oxide had the composition defined as y=0.2 and z=0.03.

Comparative Example 1

Without using any compound containing boron, lithium nitrate (having purity of 99.0% or above) and nickel oxide (having purity of 99% or above) were mixed in the ratio: Li:Ni=1:1, and the lithium composite oxide had the composition defined so as to satisfy y=0 and z=0. Except for this, a coin-type lithium secondary cell was prepared in the same way as in Example 1.

Comparative Example 2

No compound containing boron was used, and the lithium composite oxide had the composition defined so as to satisfy y=0.1 and z=0. Except for this, a coin-type lithium secondary cell was prepared in the same way as in Example 1.

Comparative Example 3

No compound containing boron was used, and the lithium composite oxide had the composition defined so as to satisfy y=0.2 and z=0. Except for this, a coin-type lithium secondary cell was prepared in the same way as in Example 1.

Comparative Example 4

The lithium composite oxide had the composition defined so as to satisfy y=0 and z=0.02. Except for this, a coin-type lithium secondary cell was prepared in the same way as in Example 1.

Comparative Example 5

The lithium composite oxide had the composition defined so as to satisfy y=0 and z=0.03. Except for this, a coin-type lithium secondary cell was prepared in the same way as in Example 1.

Comparative Example 6

The lithium composite oxide had the composition defined so as to satisfy y=0 and z=0.04. Except for this, a coin-type lithium secondary cell was prepared in the same way as in Example 1.

Comparative Example 7

The lithium composite oxide had the composition defined so as to satisfy y=0 and z=0.06. Except for this, a coin-type lithium secondary cell was prepared in the same way as in Example 1.

Comparative Example 8

The lithium composite oxide had the composition defined so as to satisfy y=0.1 and z=0.04. Except for this, a coin-type lithium secondary cell was prepared in the same way as in Example 1.

Comparative Example 9

The lithium composite oxide had the composition defined so as to satisfy y=0.1 and z=0.06. Except for this, a coin-type lithium secondary cell was prepared in the same way as in Example 1.

Comparative Example 10

The lithium composite oxide had the composition defined so as to satisfy y=0.2 and z=0.04. Except for this, a coin-type lithium secondary cell was prepared in the same way as in Example 1.

Comparative Example 11

The lithium composite oxide had the composition defined so as to satisfy y=0.2 and z=0.06. Except for this, a coin-type lithium secondary cell was prepared in the same way as in Example 1.

Examination of Charge/Discharge Property

The coin-type lithium secondary cells in each of the Examples and the Comparative Examples were constant-current charged until a circuit voltage reached 4.2 V. After the voltage reached 4.2 V, constant-voltage charge was carried out until the current became 0. Then, constant-current discharge was carried out until the voltage reached 3.0 V. The charge/discharge current density was set to 0.52 mA/cm$^2$. The charge/discharge property was obtained by the following equation (1).

charge/discharge property=initial (first cycle) discharge capacity/ initial (first cycle) charge capacity     (1)

The charge/discharge property was obtained for each of the above-mentioned Examples and Comparative Examples as shown in Table 1 below.

TABLE 1

| | y and z in chemical formula | Initial charge/discharge property, % | Initial charge/discharge capacity, mAh/g |
|---|---|---|---|
| Example 1 | 0.1, 0.02 | 90.0 | 187 |
| Example 2 | 0.2, 0.02 | 91.2 | 172 |
| Example 3 | 0.1, 0.03 | 88.2 | 168 |
| Example 4 | 0.2, 0.03 | 92.4 | 161 |
| Comparative Example 1 | 0.0, 0.00 | 82.1 | 208 |
| Comparative Example 2 | 0.1, 0.00 | 85.0 | 190 |
| Comparative Example 3 | 0.2, 0.00 | 87.5 | 175 |
| Comparative Example 4 | 0, 0.02 | 83.5 | 190 |
| Comparative Example 5 | 0.0, 0.03 | 82.9 | 170 |
| Comparative Example 6 | 0.0, 0.04 | 82.0 | 150 |
| Comparative Example 7 | 0.0, 0.06 | 80.0 | 133 |
| Comparative Example 8 | 0.1, 0.04 | 86.9 | 144 |
| Comparative Example 9 | 0.1, 0.06 | 83.1 | 130 |
| Comparative Example 10 | 0.2, 0.01 | 92.6 | 140 |
| Comparative Example 11 | 0.2, 0.06 | 90.1 | 122 |

As shown in Table 1, cells of Examples 1 to 4 are superior to the cells of Comparative Examples 1 to 11 both in the initial discharge capacity and in charge/discharge property.

FIG. 1 shows results of each of the Examples and the Comparative Examples plotted along the horizontal axis representing the cobalt content "y" and the vertical axis representing the boron content "z". In this figure, an area marked by slanting lines satisfies the following conditions: the initial charge/discharge property is 88% or above and the initial discharge capacity is 160 mAh/g or above. As shown in FIG. 1, The area marked by the slanting lines and contain the Examples 1 to 4 can be defined as follows: $0.1y \leq z \leq 0.05y+0.0026$, wherein $0<z\leq 0.03$.

As is known from the results given above, when the lithium-nickel oxide contains cobalt and boron whose contents satisfy the above-described relationship, it is possible to significantly improve the charge/discharge property and to obtain an energy density higher than the LiCoO$_2$ which is used in practice.

As is clear from the explanation above, the present invention enables to improve a charge/discharge property and realize a high energy density of a cell by adding a predetermined amounts of cobalt and boron in a solid state to be dissolved in a lithium-nickel composite oxide which is used as a positive electrode active material.

What is claimed is:

1. A non-aqueous electrolyte secondary cell comprising:
   a positive electrode comprising an active cathode material comprising a lithium composite oxide having the formula LiNi$_{0.882}$ Co$_{0.098}$ B$_{0.02}$O$_2$ or LiNi$_{0.784}$Co$_{0.196}$B$_{0.02}$O$_2$;
   a negative electrode using a negative electrode active material capable of reversibly intercalating lithium; and
   a non-aqueous electrolytic solution comprising a lithium salt dissolved or dispersed in a non-aqueous solvent.

2. The non-aqueous electrolyte secondary cell as claimed in claim 1, wherein said negative electrode active material is selected from the group consisting of lithium metal and a lithium alloy.

3. The non-aqueous electrolyte secondary cell as claimed in claim 1, wherein said negative electrode active material is selected from the group consisting of graphite, non-graphitizable carbon, and graphitizable carbon.

4. The non-aqueous electrolyte secondary cell as claimed in claim 1, wherein said electrolytic solution comprises a cyclic ester and a chain ester.

5. The non-aqueous electrolyte secondary cell as claimed in claim 4, wherein said cyclic ester is at least one cyclic ester selected from the group consisting of ethylene carbonate, propylene carbonate, butylene carbonate, vinylene carbonate, γ-butyrolactone, and sulfolane.

6. The non-aqueous electrolyte secondary cell as claimed in claim 4, wherein said chain ester is at least one chain ester selected from the group consisting of 1,2-dimethoxyethane, 2-methyltetrahydrofuran, 3-methyl-1, 3-dioxisoran, methyl propionate, methyl butylate, dimethyl carbonate, diethyl carbonate, and dipropylene carbonate.

7. The non-aqueous electrolyte secondary cell as claimed in claim 1, wherein said lithium salt is selected from the group consisting of LiClO$_4$, LiPF$_6$, LiAsF$_6$, LiBF$_4$, LiCF$_3$SO$_3$ and LiN(CF$_3$SO$_2$)$_2$.

8. A non-aqueous electrolyte secondary cell comprising:
   a positive electrode comprising an active cathode material comprising a lithium composite oxide having the formula Li(Ni$_{1-y}$Co$_y$)$_{1-z}$B$_z$O$_{2-p}$, wherein y and z indicate a composition ratio of Ni, Co and B such that $0.1y \leq z \leq 0.05y+0.026$, $y>0$, $0<z\leq 0.03$ and $p\neq 0$;
   a negative electrode comprising a negative electrode active material capable of reversibly intercalating lithium; and
   a non-aqueous electrolytic solution comprising a lithium salt dissolved or dispersed in a non-aqueous solvent, said non-aqueous electrolyte secondary cell exhibiting an initial charge/discharge property of 88% or more and an initial discharge capacity of 160 mAh/g or more.

* * * * *